United States Patent [19]

Ho et al.

[11] Patent Number: 5,727,951
[45] Date of Patent: Mar. 17, 1998

[54] RELATIONSHIP-BASED COMPUTER-AIDED-EDUCATIONAL SYSTEM

[76] Inventors: Chi Fai Ho, 4816 Cabello Ct., Union City, Calif. 94587; Peter P. Tong, 1807 Limetree La., Mountain View, Calif. 94040

[21] Appl. No.: 664,023

[22] Filed: May 28, 1996

[51] Int. Cl.⁶ .................................................. G09B 7/04
[52] U.S. Cl. ............................................................ 434/362
[58] Field of Search ................................................ 434/362

[56] References Cited

U.S. PATENT DOCUMENTS

| | | | |
|---|---|---|---|
| 5,035,625 | 7/1991 | Munson et al. | 434/332 |
| 5,286,036 | 2/1994 | Barabash | 273/429 |
| 5,597,312 | 1/1997 | Bloom et al. | 434/362 |

OTHER PUBLICATIONS

Computerized Adaptive Testing, Oct. 24, 1994, from World Wide Web, URL=Gopher://Gopher.ETS.org.
Innovation and Technologies, Oct. 21, 1994, from World Wide Web, URL=Gopher://Gopher.ETS.org.
Active Mind Series from World Wide Web, URL=http://www.broderbund.com/studio/ams.html No date.
Logical Journal of the Zoombinis from World Wide Web, URL=http://www.broderbund.com/studio/atoz/zoombini.html No date.

*Primary Examiner*—William H. Grieb
*Attorney, Agent, or Firm*—Peter P. Tong

[57] ABSTRACT

A computer-aided-educational system and method to further a student's understanding in a subject through associating the subject's different areas that the student has learnt. The subject is divided into line-items and relationship-items, with each relationship-item relating two or more items. The items are separated into learnt and un-learnt elements. The invention includes the steps of (1) selecting an un-learnt element; (2) generating learning materials for the student to learn the selected element; and (3) assessing the student's learning progress in the selected element. If the assessment on the selected element is satisfactory, then the invention (1) classifies one or more relationship-items to be learnt as un-learnt elements, with each classified relationship-item relating the selected element with one or more learnt elements; and (2) re-classifies the selected element as a learnt-element. Then the invention repeats from the step of selecting an un-learnt element. The steps can repeat until all the un-learnt elements have been learnt, and at that point, the student has mastered the subject.

20 Claims, 8 Drawing Sheets

RELATIONSHIP-BASED COMPUTER-AIDED-EDUCATIONAL SYSTEM

BACKGROUND OF THE INVENTION

The present invention relates generally to education and more particularly to educating related areas to enrich the learning process in a computer-aided-educational system.

In today's educational system, typically, a fixed syllabus controls the educational process of a subject. An instructor follows the syllabus religiously so as to cover the entire syllabus by the end of the term.

Such an educational system does not take into account individual student's progress. For a class of thirty, if the instructor wants to finish the syllabus, the instructor cannot hold up the class just to teach a few students. If the students' levels of understanding in the subject are not similar, the instructor has to leave some students behind. Such situation is particular prevalent in a multi-cultural teaching environment, with students having different understanding levels due to their different cultural backgrounds attending the same class.

One excellent way to learn is through association, where the instructor teaches a student to associate the different areas she has learnt. However, as explained above, with the instructor focusing on finishing the syllabus, and with the students not having similar understanding levels, it is difficult for the instructor to teach through association. Some students may not even understand the individual areas. It is not realistic to expect them to understand how those areas are related. Moreover, with a class of thirty students or more, it is extremely hard for the instructor to teach association at a difficulty level that is tailored to each student.

It should be apparent from the foregoing that there is a need for a system and a method to tailor a teaching approach on a subject for each student through associating the subject's different areas that the student has learnt.

SUMMARY OF THE INVENTION

The present invention provides a computer-aided-educational system and method to further a student's understanding in a subject through associating the subject's different areas that the student has studied. Based on computer technology, the invention can be tailored specifically to each student's progress in understanding the subject.

The subject is divided into line-items and relationship-items. Each line-item covers one area in the subject, and each relationship-item covers areas that relate two or more items. The items are separated into learnt and un-learnt elements.

One embodiment of the invented system includes a selector for selecting and classifying elements, a generator for generating learning materials for the student, and an assessor for assessing the student's learning progress.

In one embodiment of the invented method, first, the selector selects one un-learnt element. After the selection, the generator generates learning materials for the student to learn the selected element, and the assessor assesses the student's learning progress in the selected element. If the assessment on the selected un-learnt element is satisfactory, then the selector (1) classifies one or more relationship-items to be learnt as un-learnt elements, with each classified relationship-item relating the selected element with one or more learnt elements; and (2) re-classifies the selected element as a learnt-element. Then, the invention repeats from the step of selecting an un-learnt element, which can be a line-item, or a relationship-item. The invention can repeat until all the un-learnt elements have been learnt, and at that point, the student has mastered the subject.

There are different ways for the selector to select an un-learnt element. In one embodiment, the invention selects an un-learnt line-item or an un-learnt relationship-item, depending on a value set by an instructor. If the un-learnt element is a line-item, the selection process to select which line-item is based on the difficulty level of the line-item; if the un-learnt element is a relationship-item, the selection process is based on the difficulty level of the relationship-item, when the relationship-item was classified as an un-learnt element, and/or whether the student has any prior failure in learning the relationship-item.

For the learning materials, in one embodiment, the learning material is related to questions. In another embodiment, the learning material is related to study plans. The invention enhances the student's learning process through providing the student with either questions or study plan or both.

Other aspects and advantages of the present invention will become apparent from the following detailed description, which, when taken in conjunction with the accompanying drawings, illustrates by way of example the principles of the invention.

Same numerals in FIGS. 1-7 are assigned to similar elements in all the figures embodiments of the invention are discussed below with reference to FIGS. 1-7. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
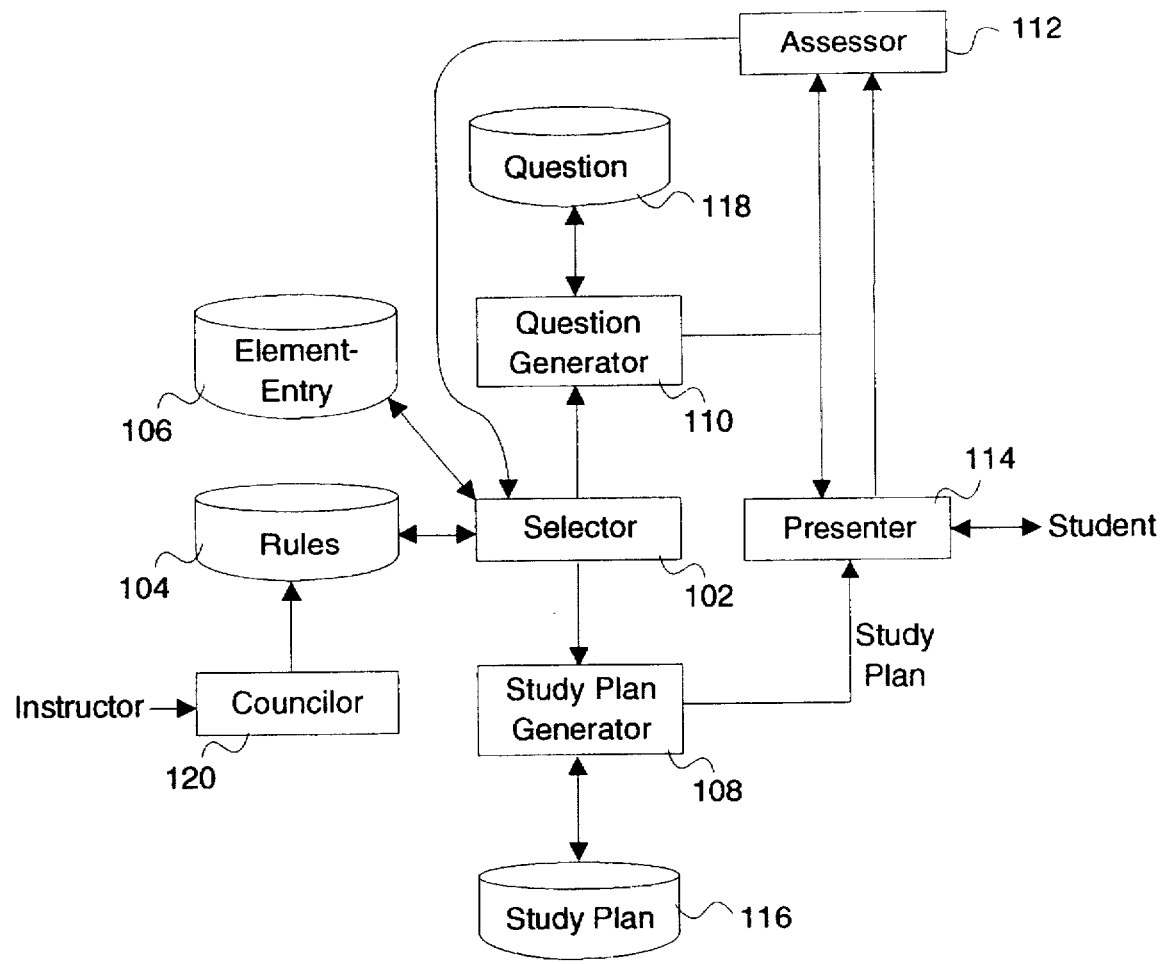
FIG. 1 shows an embodiment of the present invention.

FIG. 1 shows one embodiment of the computer-aided-educational system 100 of the present invention to teach a subject. As an overview of some of its major components, the system 100 includes a selector 102, which, based on some rules from a rules storage-medium 104, selects an un-learnt element from an element-entry storage-medium 106. For the un-learnt element, a study-plan generator 108 assesses a study plan from a study-plan storage-medium 116 for a presenter 114 to present to a student. After the plan has been presented, a question generator 110 assesses a set of questions from a question storage-medium 118 and sends the questions to the presenter 114 to be presented to the student. Then, an assessor 112 analyzes the student's answers, and sends the results to the selector 102, which then selects the next un-learnt element to be learnt.

Figure 2A:
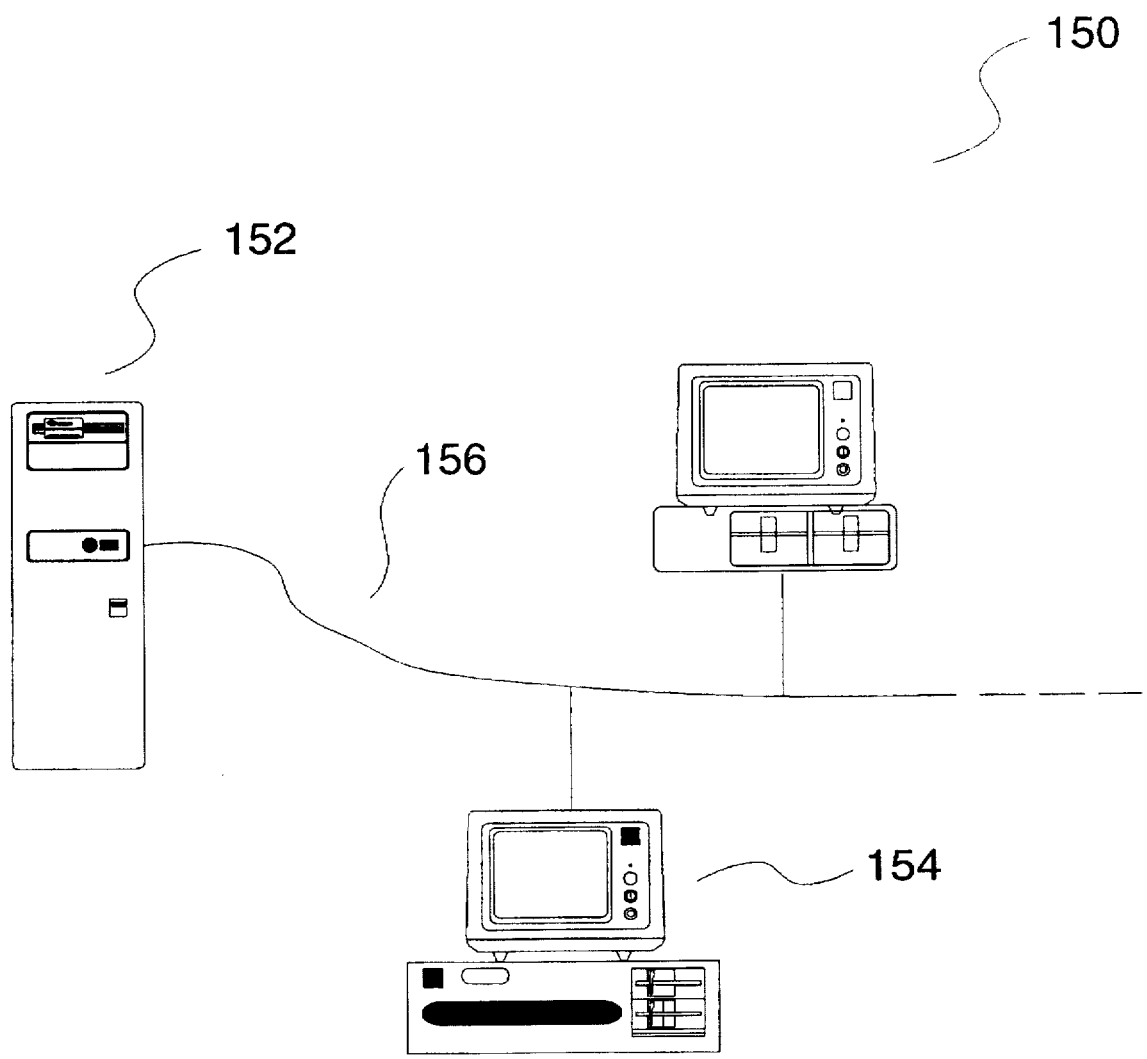
FIGS. 2A-B show one embodiment of a system implementing the present invention.
Figure 2B:
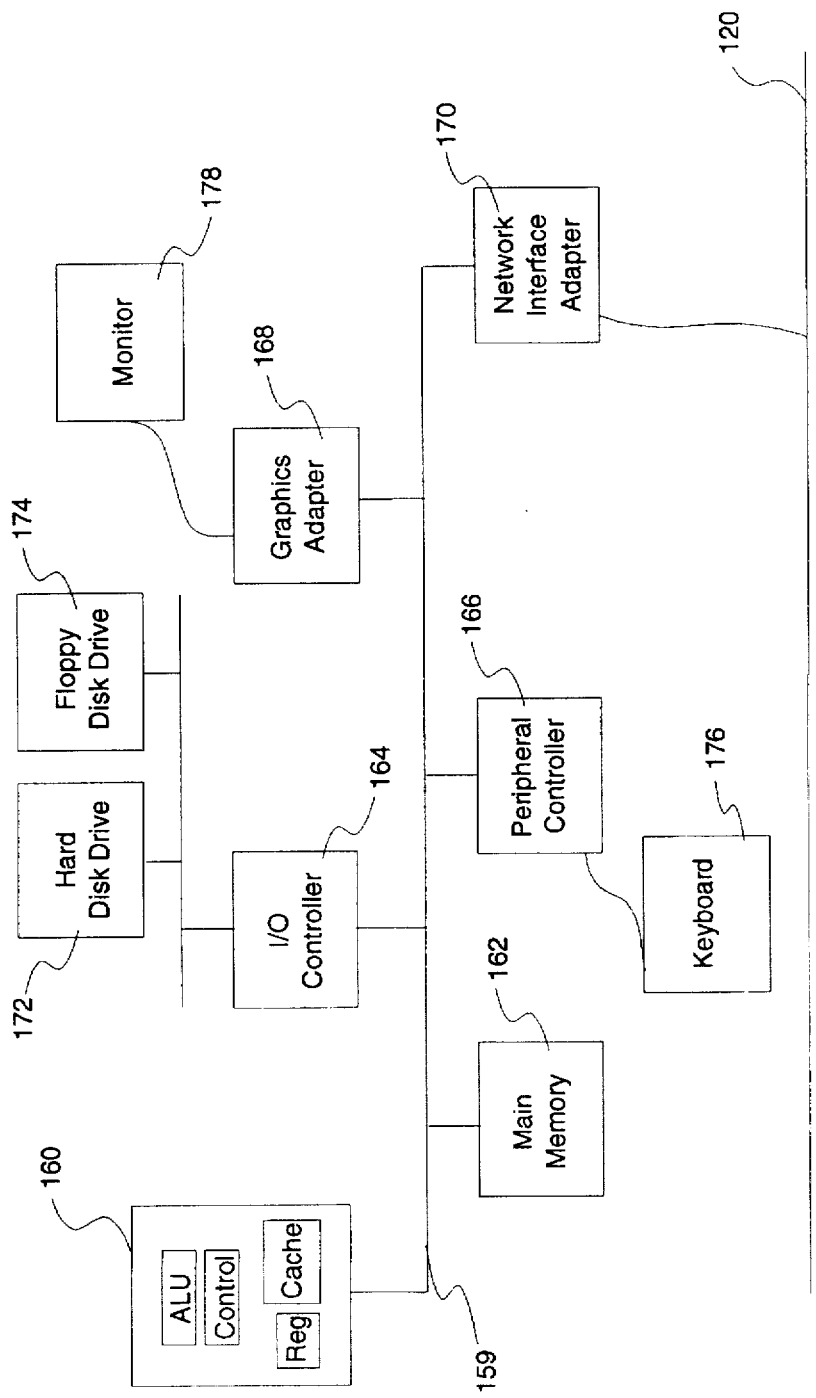

FIG. 2A shows one embodiment of a system 150 implementing the present invention, preferably in software and hardware. The system 150 includes a server computer 152 and a number of client computers, such as 154. Each client computer communicates to the server computer 152 through a dedicated communication link, or a computer network 156. FIG. 2B shows one embodiment of the client computer 154. It typically includes a bus 159 connecting a number of components, such as a processing unit 160, a main memory 162, an I/O controller 164, a peripheral controller 166, a graphics adapter 168 and a network interface adapter 170. The I/O controller 164 is connected to components, such as a harddisk drive 172 and a floppy disk drive 174. The peripheral controller 166 is connected to components, such as a keyboard 176. The graphics adapter 168 is connected to a monitor 178; and the network interface adapter 170 is connected to the network 120. The network includes the internet, the intranet, the world wide web and other forms of networks.

Different components of the present invention can be in different elements shown in FIGS. 2A–B. For example, the presenter 114 and the assessor 112 can be in a client computer; the selector 102, the question generator 110, the study-plan generator 108, and the element-entry storage-medium 106 can be in the server computer 152. In another embodiment, the selector 102, the question generator 110 and the study-plan generator 108 are also in a client computer. A number of operations in the present invention can be implemented by software, which is controlled, for example, by the processing unit 160. In yet another embodiment, the number of operations implemented by software can be stored in a storage-medium, which can be, for example, the main memory 162 or a CD read-only-memory.

In one embodiment, the subject is divided into relationship-items and major-topics, with each major-topic subdivided into minor-topics, and with each minor-topic further subdivided into line-items. In another embodiment, the subject is further divided into more levels below the line-items; and in a third embodiment, the subject is just divided into relationship-items and line-items.

Line-items have different difficulties. Typically, a student learning a subject starts from learning line-items at the lowest difficulty level. As an example of line-items, if the major-topic of the subject mathematics is high school algebra, then the major-topic can be divided into the following line-items, with bracketed terms as comments:

High School Algebra (the major-topic)

(Minor-topics under the major-topic)

Decimal Numbers

Polynomials

Linear Equations

Quadratic Equations

Integers (Line-items under the minor-topic of integers)

Addition & Subtraction (Difficulty level 1)

Multiplication (Difficulty level 2)

Division (Difficulty level 2)

Prime Numbers (Difficulty level 3)

Factorization (Difficulty level 3)

Common Divisor (Difficulty level 4)

Fractions (Line-items under the minor-topic of fractions)

Addition & Subtraction ($\pm$) with Common Denominator (Difficulty level 3)

$\pm$ with Integers (Difficulty level 4)

$\pm$ without Common Denominator (Difficulty level 5)

Multiplication and Divisions (*./) with Integers (Difficulty level 5)

*./ with fraction (Difficulty level 6)

Compound Fractions (Difficulty level 6)

Fraction Reduction (Difficulty level 7)

Ratios and Proportions (Difficulty level 7)

Another example with the minor topic being differential calculus is as follows:

Calculus (major topic)

Differential calculus (minor topic)

Fractions (Difficulty level 1)

Polynomials (Difficulty level 1)

Exponential Functions (Difficulty level 1)

Differentiation (Difficulty level 2)

Differentiate a sum (Difficulty level 3)

Differentiate a product (Difficulty level 3)

Differentiate a quotient (Difficulty level 4)

Each difficulty level indicates how difficult its corresponding line-item is as compared to other line-items. A line-item whose difficulty level is at a lower number implies that it is an easier line-item.

Each relationship-item relates two or more items, which can be line-items or relationship-items. The following serves as examples of relationship-items:

| Relationship-items | Example |
|---|---|
| R1 (Fractions, Polynomials) | $(x + 2)/(x^2 - 3x + 4)$ |
| R2 (Fractions, Exponential-Functions) | $e^{x+2}/e^{3y-1}$ |
| R3 (Polynomials, Exponential-Functions) | $e^{x^2-3x+4}$ |
| R4 (Fractions, Polynomials, Exponential-Functions) | $e^{x^2-3x+4}/e^{3y-1}$ |
| R5 (Differentiation, Polynomials) | $d(x^2 - 3x + 4)/dx$ |
| R6 (Differentiation, Exponential-Functions) | $d\, e^{x+2}/dx$ |
| R7 (Diff-Sum-Rule, Exponential-Functions) | $d\,(e^{x+2} + e^{x-1})/dx$ |
| R8 (Diff-Product-Rule, Polynomials) | $d(x + 2)*(x^2 - 3x + 4)/dx$ |
| R9 (Diff-Product-Rule, Diff-Sum-Rule, Polynomials, Exponential-Functions) | $d((x + 2)* e^{x-1} + e^{x^2-3x+4})/dx$ |
| R10 (Diff-Quotient-Rule, Fractions, Polynomials) | $d((x + 2)/(x^2 - 3x + 4))/dx$ |
| R11 (Diff-Quotient-Rule, Fractions, Polynomials, Diff-Sum-Rule, Exponential-Functions) | $d((e^{x+2} + x^2 - 3x + 4)/(x + 2))/dx$ |
| R12 (Diff-Quotient-Rule, Diff-Product-Rule, Diff-Sum-Rule, Fraction, Polynomials, Exponential-Functions) | $d((x\, e^{x+2} + x^2 - 3x + 4)/(x + 2))/dx$ |

Note that R9 is a relation-item relating R7 and R8; and R11 relating R10 and R7.

The lists of items in the above examples are generated based on expert knowledge on the subject of mathematics. Each line-item covers one area in the subject, and a relationship-item covers an area that relates one or more items. With the proper instruction, such as through reading the present specification, generating such lists with the difficulty levels should be obvious to experts in the subject. The more knowledgeable the expert, the more complete the sets of items, and the more accurate the difficulty levels.

Figure 3:
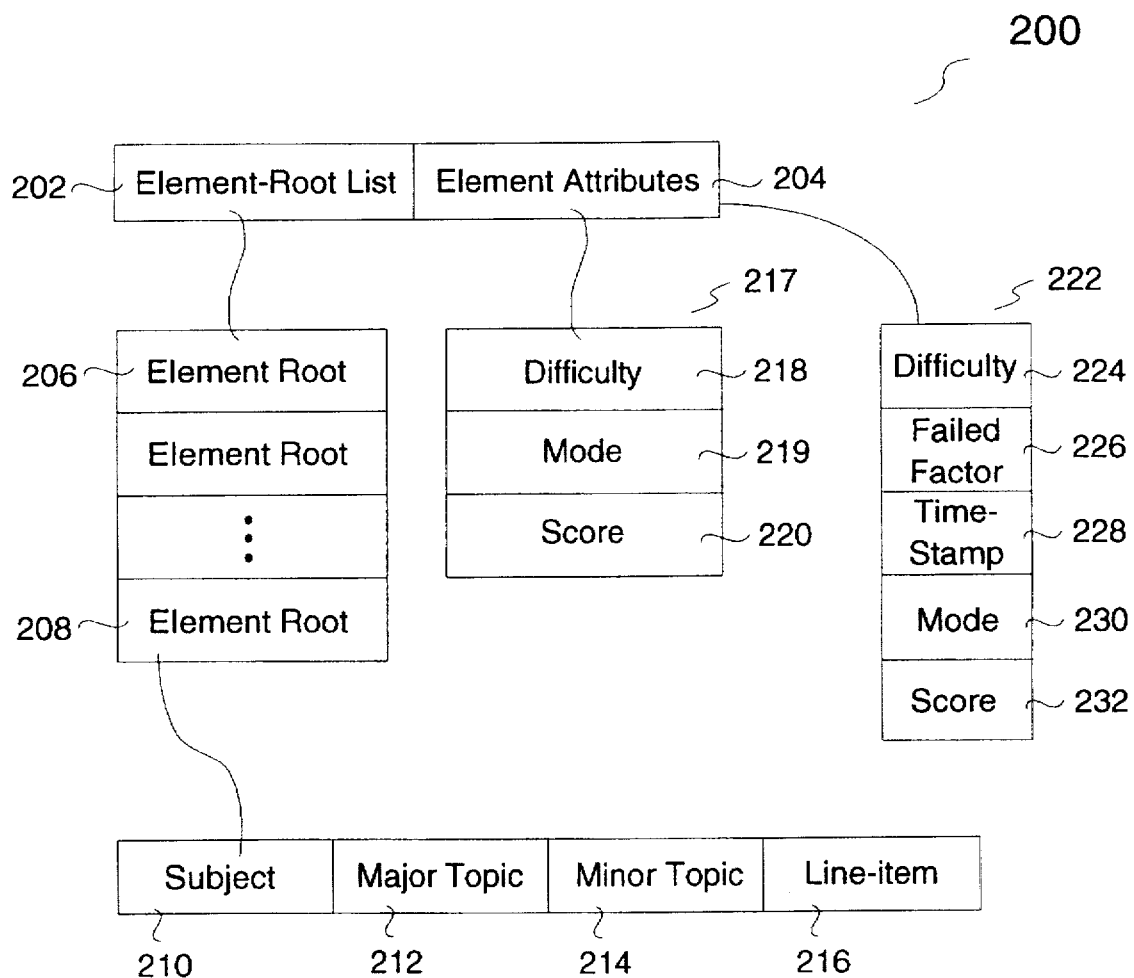
FIG. 3 shows one embodiment of an element-entry in the present invention.

In one embodiment, the relationship-items and the line-items are stored as elements with entries in the element-entry storage-medium 106. FIG. 3 shows one embodiment 200 of an element-entry E, with an element-root list 202 and element attributes 204. The element-root list 202 has one or more element-roots, such as 206 and 208. Each element-root represents one line-item and its root, such as its subject 210, major topic 212, minor topic 214 and the line-item 216. The element attributes 204 describe a number of attributes of the corresponding element-entry.

For a line-item, its element-root list has only one element-root; and its element attributes 217 includes its difficulty level 218, its mode 220 and its score 220. The mode represents whether the student has learnt the line-item (the learnt mode), or the student has not learnt the line-item (the un-learnt mode). In other words, an un-learnt element is the same as an element having an un-learnt mode; and a learnt element is the same as an element having a learnt mode. The score 220 represents how well the student did in his prior attempt to learn this line-item.

For a relationship-item, its element-root list has two or more element-roots. Those corresponding line-items are related to form the relationship-item. The element attributes 222 include a difficulty level 224, a failed factor 226, a time-stamp 228, a mode 230, and a score 232. The difficulty level 224 represents how difficult the relationship-item is. In one embodiment, the difficulty level is the sum of the difficulty levels of all its corresponding line-items. The failed factor 226 indicates the number of times the student has previously failed learning this relationship-item. The mode 230 can be either a learnt mode, an un-learnt mode, or an un-used mode. The time-stamp 228 represents the time when the relationship-item is changed from an un-used mode to an un-learnt mode. The score 232 again represents how well the student did in his prior attempt to learn this relationship-item.

Initially, in one embodiment, the score fields of all entries are zero.

the mode fields of all line-item element-entries are classified as un-learnt.

the mode fields of all relationship-item element-entries are classified as un-used.

the time-stamps of all relationship-item element-entries are not set.

the failed factors of all relationship-item element-entries are set to zero.

the difficulty fields of all line-item element-entries are preset.

the difficulty fields of all relationship-item element-entries are calculated such as from the difficulty fields of line-item element-entries.

Figure 4:
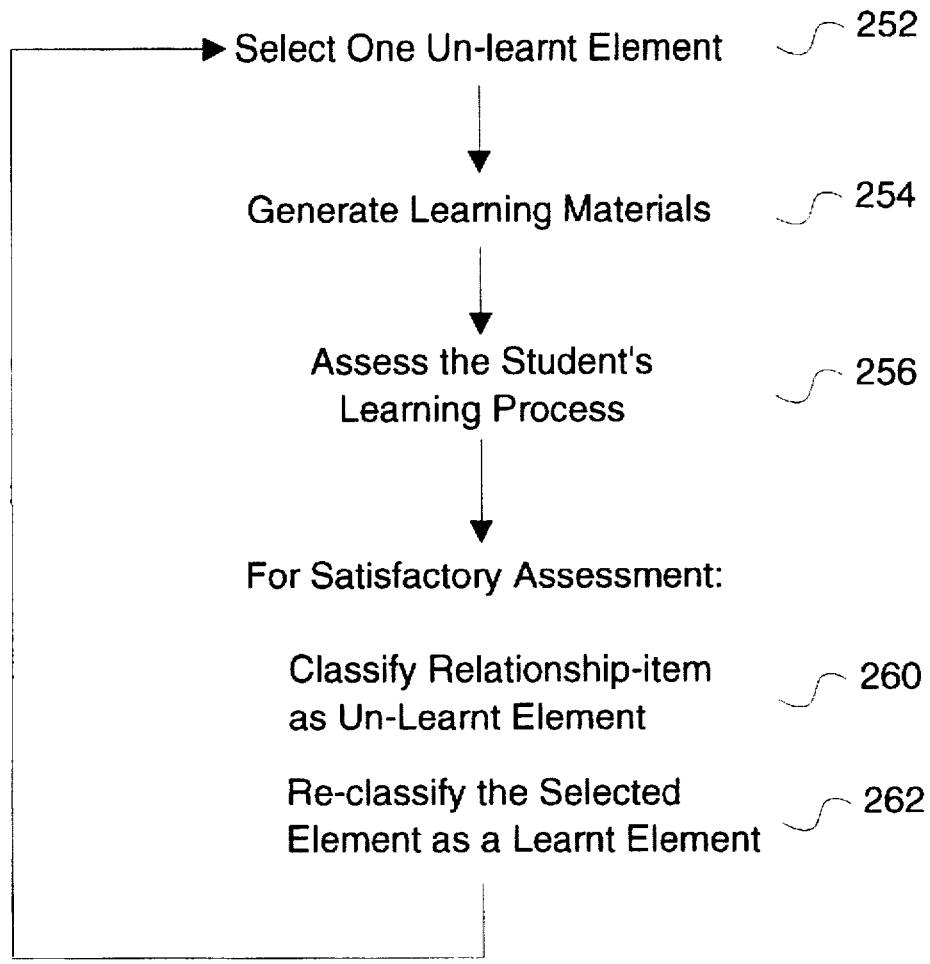
FIG. 4 shows a set of steps to implement one embodiment of the present invention

FIG. 4 shows a set of steps 250 to implement one embodiment of the present invention. First, the selector 102 selects 252 one un-learnt element or an element whose mode is un-learnt. After the selection, a generator, which can be the question selector 110 or the study plan generator 108, generates 254 learning materials for the student to learn the selected element, with the assessor 112 assessing 256 the student's learning progress on the selected element. If the assessment on the selected element is satisfactory, the selector 102 tries to classify 260 one or more relationship-items to be learnt, from the un-used mode to the un-learnt mode, with each classified relationship-item relating the selected element with one or more learnt elements. Note that there may not be such a relationship-item, but if there is such a relationship-item, the selector classifies 260 it as an un-learnt element. The time when the selector 102 classifies each relationship-item as an un-learnt element is stored in the time-stamp of that relationship-item's element-entry. For satisfactory assessment, the selector 102 also re-classifies 262 the selected element from the un-learnt mode to the learnt mode. Then, the process repeats from the step where the selector 102 selects 252 an un-learnt element. This repetition can continue until there is no more element in the un-learnt mode—the student has learnt all the elements.

Figure 5:
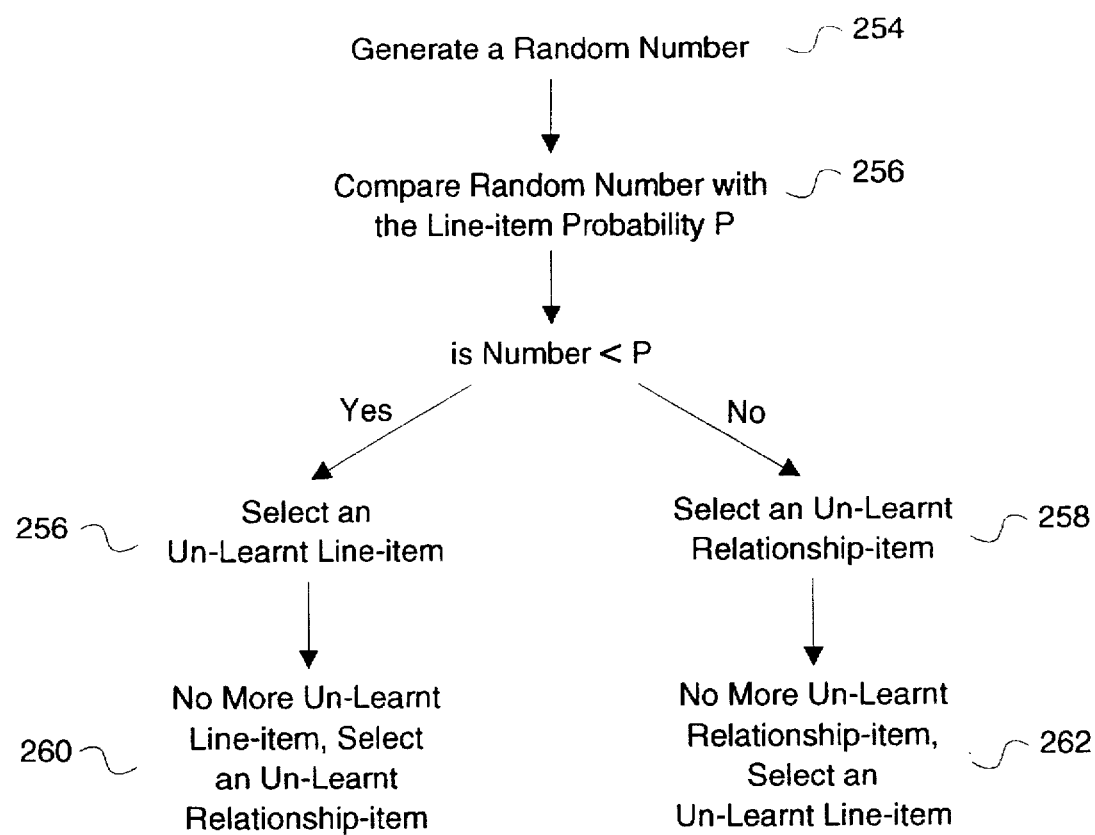
FIG. 5 shows one set of steps to select an un-learnt line-element or a relationship-item in the present invention.

FIG. 5 shows one set 252 of steps to select an un-learnt line-item or an un-learnt relationship-item in the present invention. In one embodiment, this process depends on a value, named a line-item probability P, which can be set by an instructor through a councilor 120. The probability P is stored in the rules storage-medium 104. Based on the probability P, a line-item is selected (100*P)% of the time and a relationship-item (100*(1−P))% of the time. Then, for the selection process, the selector 102 generates 254 a random number between 0 and 1, and compares 256 the random number with P. If the number is smaller than P, the selector selects 256 an un-learnt line-item. If there is no more un-learnt line-item, an un-learnt relationship-item is selected 260 instead. If the number is bigger than or equal to P, the selector selects 258 an un-learnt relationship-item. If there is no more un-learnt relationship-item, the selector 102 selects 262 an un-learnt line-item. If there is just no more un-learnt items, the student has mastered the subject.

In one embodiment, one characteristic of the probability P is that the higher the value of P, the more likely the selector 102 selects an un-learnt line-item. Such a system/method emphasizes on teaching new concepts. The smaller the value of P, the more likely the selector 102 selects an un-learnt relationship-item. Such a system/method emphasizes on teaching relationship to enforce the understanding of the learnt line-items before attempting new concepts.

If P is set to zero, the selector 102 selects an un-learnt relationship-item that has been classified from the un-used mode before selecting an un-learnt line-item. Sometimes, it is beneficial to work on the relationship-items immediately after the student has successfully worked on its corresponding line-item or relationship-item. For example, once a student has mastered the basic concept of differentiation, the student works on the areas of differentiating polynomials, sine, cosine and tangent. In another example, once a student has mastered the basic concept of an inductor and a capacitor, the student works on the relationship-item of an oscillator based on an inductor and a capacitor. If the student has previously mastered the concept or line-item of resistance, then after mastering the concept of an oscillator, the student works on the relationship-item of a damped-oscillator, which is an oscillator with ohmic loss. One way to ensure learning the relationship-items immediately after they have been generated is to store them separately in a stack or a sequential-accessed memory. The items in the stack are accessed before items in other storage areas.

Figure 6:
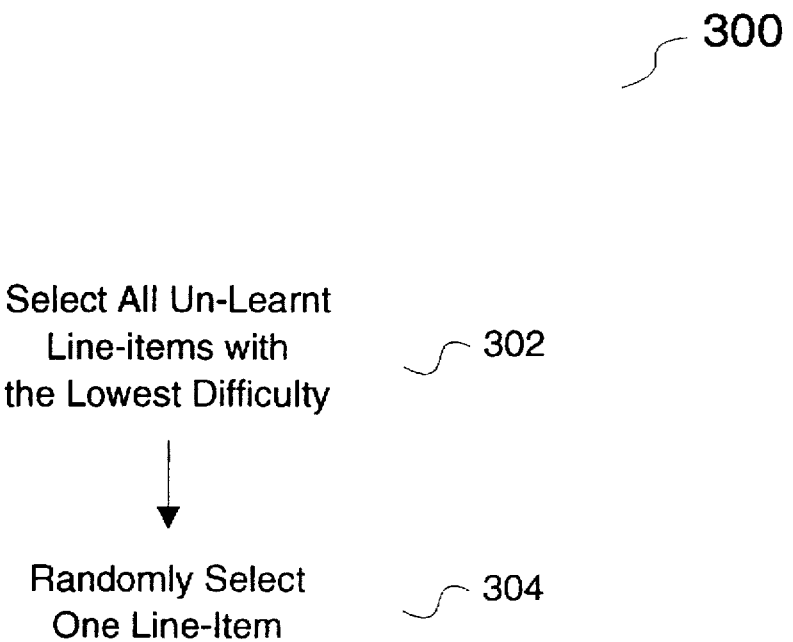
FIG. 6 shows one embodiment for the selector to select a specific un-learnt line-item in the present invention.

After the selector 102 has decided to select an un-learnt line-item, FIG. 6 shows one embodiment 300 for the selector 102 to select one specific un-learnt line-item. First, among all un-learnt line-items, the selector selects 302 those at the lowest difficulty level; this level may not be the lowest possible, but is the lowest among the un-learnt ones. If there are more than one such line-items, the selector 102 randomly selects 304 one of them as the un-learnt element for the student to work on.

If the selector 102 has decided to select an un-learnt relationship-item, in one embodiment, the selector 102 picks one specific un-learnt relationship-item based on its weight W, which is defined by the following equation:

$$W = a*f(D) + b*g(T-To) + c*h(R)$$

The weight factors are defined as follows:

D=the difficulty level of the relationship-item.

T=the current time or the time when the selector is selecting an un-learnt relationship-item.

To=the time of its time-stamp, or the time when the relationship-item is changed from the un-used mode to the un-learnt mode.

(T−To)=the elapsed time or the time between the current time and the time-stamp.

R=the failed factor indicating the number of times the student has failed learning this relationship-item.

a=a value determining the relative importance of the difficulty level.

b=a value determining the relative importance of the elapsed time.

c=a value determining the relative importance of the number of times the student has failed learning this relationship-item.

f=a function relating the difficulty level to the weight. If this function increases as D increases, then more difficult relationship-items have a higher probability of being selected. On the other hand, if this function decreases as D increases, then there is a preference to teach easier relationship-items.

g=a function relating the elapsed time to the weight. If this function increases as the elapsed time increases, there is a preference to teach un-learnt relationship-items having been changed from the un-used mode for a period of time. If this function decreases as the elapsed time increases, there is a preference to teach un-learnt relationship-items newly changed from the un-used mode.

h=a function relating the weight to the number of times the student has failed learning the item. If this function increases as the student fails learning the item, then the system prefers to keep working on a failed relationship-items before starting on a new line-item. If this function decreases as the student fails learning the item, then the system favors un-attempted items, so as to encourage the student to try new relationship-items before repeating a failed one.

There are many different ways to choose the functions f, g, and h. The following shows two examples:

$$f(D) = Max(m*D + n, r)$$

$$f(D) = e^{(m*D+n)} + r$$

Note that the term "Max" denotes "The maximum of." The additional weight factors in the above two equations are defined as follows:

m=a constant, such that if it is a positive number, f increases as D increases.

n=a constant.

r=a non-negative constant.

In one embodiment, the above weight factors are configured through the councilor 120 by the instructor, who sets those values according to the needs of the student as well as the subject areas to be taught. In another embodiment, the above weight factors are preset by the system 100 with default values.

The following covers three examples of different weight factors for relationship-items with default values:

(1) The first example encourages a student to explore her interest. The system encourages teaching new concepts or line-items, and favors easier ones.

| Line-Item-Probability | 0.8 |
|---|---|
| Weight | $6 * f(D) + 6 * g(T-T0) + h(R)$ |
| | $f(D) = Max(-4*D + 20, 10)$ |
| | $g(T-T0) = 5e^{-3*(T-T0)} + 8$ |
| | $h(R) = Max(-R + 20, 10)$ |

A high line-item probability value favors line-items. For the three functions, f, g, and h: f is chosen to favor easier relationship-items; g is chosen to significantly favor newly introduced relationship-items; and h is chosen to discourage teaching previously-failed relationship-items.

(2) The second example encourages a student to thoroughly learn a line-item before moving on to the next one. The system also encourages teaching new concepts or line-items, and favors easier ones.

| Line-Item-Probability | 0.7 |
|---|---|
| Weight | $4 * f(D) + 3 * g(T-T0) + 7 * h(R)$ |
| | $f(D) = Max(-4*D + 20, 10)$ |
| | $g(T-T0) = 6e^{3*(T-T0)} + 8$ |
| | $h(R) = 5*R$ |

A relatively high line-item probability value again favors line-items. For the three functions f, g, and h: f is chosen to favor easier relationship-items; g is chosen to significantly favor newly-aged relationship-items; and h is chosen to favor previously-failed relationship-items.

(3) The third example encourages learning through association to ensure better understanding a line-item before moving on to a new line-item.

| Line-Item-Probability | 0.2 |
|---|---|
| Weight | $2 * f(D) + 6 * g(T-T0) + h(R)$ |
| | $f(D) = e^{(-4D+10)}$ |
| | $g(T-T0) = 5e^{3*(T-T0)} + 8$ |
| | $h(R) = 50*R + 6$ |

A low line-item probability value favors relationship-items. For the three functions, f, g, and h: f is chosen to significantly favor easier relationship-items; g is chosen to significantly favor newly-aged relationship-items; and h is chosen to favor re-teaching previously-failed relationship-items.

In the above embodiment, the selector 102 chooses a particular un-learnt relationship-item based on its weight. With the above weight equation, each un-learnt relationship-item has its corresponding weight. In one embodiment, the selector 102 picks the un-learnt relationship-item with the largest weight. If two items have the same weight, the selector 102 randomly picks one of them.

In another embodiment, the selector 102 picking the un-learnt relationship-item is based on a weight-probability value. Each un-learnt relationship-item has a weight-probability value, which is equal to its weight divided by the sum of the weights of all the un-learnt relationship-items. The selector 102 then generates a random number rn between 0 and 1. The selection process is explained by the following example:

Assume that:

relationship-item A has a weight-probability value of 0.5;

relationship-item B has a weight-probability value of 0.3;

relationship-item C has a weight-probability value of 0.10;

relationship-item D has a weight-probability value of 0.05;

relationship-item E has a weight-probability value of 0.025; and relationship-item F has a weight-probability value of 0.025.

Then:

if rn is less than or equal to 0.5, then relationship-item A is selected;

if rn is more than 0.5 and less than or equal to 0.8, then B is selected;

if rn is more than 0.8 and less than or equal to 0.9, C is selected;

if rn is more than 0.9 and less than or equal to 0.95, D is selected;

if rn is more than 0.95 and less than or equal to 0.975, E is selected; and if rn is more than 0.975, F is selected.

In another embodiment, the element attributes in a line-item also include a failed factor, which indicates the number of times in which the student has failed learning that line-item. For such an embodiment, the selection of a line-item also depends on its failed factor. The selection process of a line-item is based on a line-item weight factor, just as that of the relationship-item. In one embodiment, the line-item weight factor includes two functions: a difficulty level function and a failed factor function.

Figure 7:
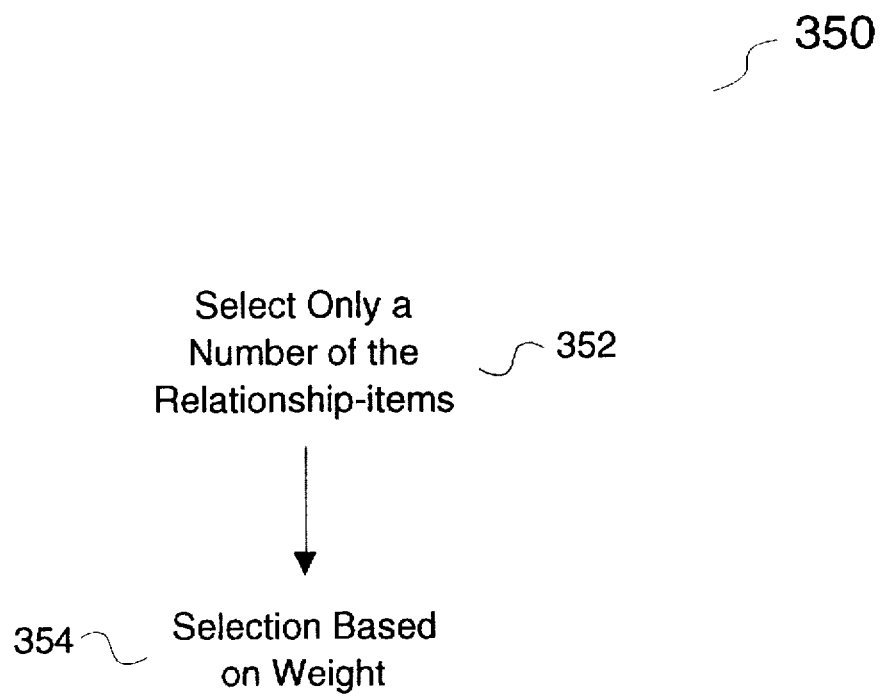
FIG. 7 shows another embodiment for the selector to select an un-learnt element in the present invention.

FIG. 7 shows another embodiment 350 to select an un-learnt element. For this embodiment, a limited number of relationship-items are automatically selected once they are classified as un-learnt elements. In situation when there might be too many relationship-items that are related to a recently-learnt line-item, for one embodiment, only a number of the relationship-items is selected 352. For example, only three or only 50% of those relationship-items are selected. Which three or which 50%, can depend on a number of factors, such as the weight 354 of the items; if a number of those items have the same weight, the selection process for those items can be random. Based on the above process, the system 100 selects an un-learnt relationship-item to be worked on.

After the selection process, the selector 102 passes the selected un-learnt element to the generator for generating learning materials for the student. In one embodiment, the element-entry E of the un-learnt element is transmitted to the generator, which can be the question generator 110, the study-plan generator 108, or both.

The learning materials can be one of two types: the first type is based on study plans and the second questions. For the first type, the selector 102 sends the un-learnt element to the study-plan generator 108, which generates 202 a study plan on the un-learnt element. The study-plan generator 108 can generate the study plan through accessing the plan from the study-plan storage-medium 116, which stores the un-learnt element with its study plan. The generator 108 after generating the study plan, transmits the plan to the presenter 114 to present to the student.

The study-plan can be a document containing studying material for the un-learnt element. The document can be arranged as a list of screens, each of which covering part of the material. The student can go from one screen to another with the keyboard 176, or a mouse device. After the study plan has been presented to the student, the study plan generator sends a mission-accomplished signal to the assessor 112. Presumably, the student, by going through the study plan, should have understood the un-learnt element.

In one embodiment, the selector 102 sends the element-entry E to the study-plan generator 108 to retrieve the corresponding study plan from the study-plan storage-medium 116. There are a number of study-plan entries in the storage-medium 116, and they are in the following format:

(element-root list, study-plan)

Based on the element-root list in the element-entry E, and with one study plan per element-root list, the generator 108 retrieves from the study-plan storage-medium 116, the corresponding study-plan entry. The generator 108 then sends the study-plan entry to the presenter 114.

The presenter 114 presents study plans to the student. Typically, the presenter includes the monitor 178. In another embodiment, the study plans are broadcast through a radio, or presented through a facsimile machine.

In another embodiment, the selector 102 sends the un-learnt element to the question generator 110, which generates 204 a set of question entries on the un-learnt element. The generation process is typically retrieving the entries from the question storage-medium 118. The question generator 110 then sends the questions to the presenter 114.

Typical, students gain a better understanding on a subject through actively working on questions, than just through passively reading study plans.

In one embodiment, each question is embedded in a question entry, which is of the following format:

(element-root list, question-body, answer).

The term "question-body" describes the body of a question. The following serves as an example:

Subject: Mathematics
Major-topic: High School Algebra
Minor-topic: Fraction
Line-item: ± with common denominator

| Answer | Question-body |
| --- | --- |
| 28/37 | What is the sum of 2/37, 3/37, 8/37 and 15/37? |
| −2/43 | 17/43 − 25/43 + 6/43 = ? |

For most of the element-root lists, each has one or more question entries. The question generator 110, by matching the element-root list of the element-entry E with the element-root lists of question entries, selects one or more question entries. For each question-entry selected, it is sent to the assessor 112, with its question-body sent to the presenter 114 to be presented to the student.

In one embodiment, the presenter 114 receives a study-plan from the study-plan generator 108, and one or more questions from the question-generator 110. The presenter 114 first presents the study-plan to the student. After the student has finished reading the study-plan and indicates that she is ready for the questions, the presenter 114 then sends a message to the assessor 112 indicating that the study-plan has been presented to the student. Also, the presenter presents the questions to the student. The student answers the questions, and the results are sent to the assessor 112. In another embodiment, the correct answers to the questions together with the student answers are sent by the presenter 114 to the assessor 112. This can be done, for example, by the student entering his answers through the keyboard 176 to the presenter 114.

In another embodiment, the learning materials only include the study-plan. The presenter 114 receives the study-plan and presents the study-plan to the student.

In a further embodiment, the learning materials only include questions. For example, the learning materials are for the relationship-item of differentiating exponential functions. A number of questions are generated, including the question on expanding an exponential function based on Taylor expansion, the question on differentiating the Taylor-expanded exponential function, whose answer is the original Taylor-expanded exponential function, and the question on differentiating the exponential function, whose answer is the exponential function. The presenter 114 bypasses study plans, and receives the questions, which are presented to the students.

Note that the formats of the learning materials may change as the student is learning. The student can learn one element based on questions, and another element based on study-plans. As an example, in the above example of a minor topic being differential calculus, for the different line-items, all of them can be learnt through both study-plans and questions, except for the line-item of differentiation, which is learnt only through a study-plan. That study-plan covers the general differentiation concept, such as the following:

$$df(x)/dx = \lim_{h \to 0}((f(x+h)-f(x))/h)$$

For the embodiment where the learning materials include questions, the assessor 112 analyzes the student's answers by comparing the student's answers to the question answers previously received. Through the analysis, the assessor 112 identifies the student's learning progress.

In one embodiment, the assessor 112 receives question-entries from the question generator 110. The assessor 112 also receives the student's answers with their corresponding question-bodies from the presenter 114. For each question, using the question-body as a key, the assessor 112 evaluates the student's answer by matching it with the answer in the corresponding question-entry.

After the assessment, the assessor 112 returns the student's performance on the element back to the selector. If the study materials are questions, the student's performance can be in the form of a score, a grade, or a pass/fail indicator. If the study materials are study-plans, the student's performance is a pass/fail indicator depending on whether the plans have been presented to the student. The selector 102 based on rules stored in the rule storage-medium 104 determines if the performance level is satisfactory or not. For example, a score of 70 or higher is satisfactory, 69 or lower is unsatisfactory; a grade of C or better is satisfactory, and D or lower is unsatisfactory; or a study-plan, after presentation, is considered as satisfactory.

If the selector 102 is satisfied with the student's performance level in the selected un-learnt element, as discussed above, all relationship-items related to that learnt element are classified as un-learnt elements, and the selected un-learnt element is re-classified as a learned element. The selector 102 then repeats to choose another un-learnt element.

In one embodiment, the assessor 112 passes an assessment-entry back to the selector 102. The format of an assessment-entry is the same as that of an element-entry, except the score field is replaced to indicate the performance level of the student in the corresponding element. The selector 102 based on rules stored in the rule storage-medium 104 determines if the performance level is satisfactory or not. Suppose the performance is unsatisfactory, and the element is a relationship-item, then its failed factor is incremented by 1. Suppose the performance is satisfactory, then the mode field is changed to the learnt mode, and the failed factor is reset to zero. Also, the selector 102 locates the list of all un-used relationship-items, whose root-lists contain only line-items of learnt elements. The mode of those one or more un-used relationship-items is changed from the un-used to the un-learnt mode, and their time-stamps are changed to the time at that instance. The selector 102 then repeats to choose another un-learnt element.

Conclusion

In one embodiment, one or more components in the system are implemented through software. In another embodiment, the present invention is implemented through an object oriented program, with each component as an object. For example, the selector 102 is an object, and the question generator 110 is another object. In yet another embodiment, one or more of the components, such as the councilor, can be implemented on a circuit, such as a field-programmable-gate-array, where the entire program embodying one or more of the components is burnt into the circuit.

The relationship-items in the present invention are not limited to items from one subject. Items from different subjects may be related together. For example, after learning the line-item of transistor from the subject of integrated circuits, and the line-item of high-frequency modeling from the subject of microwave theory, the student then learns the relationship-item of an high-frequency transistor.

In the present invention, items of one classification, such as the un-learnt elements, can be stored in more than one data structures. For example, the un-learnt line-items are stored in a random-accessed storage-medium, and the un-learnt relationship-items are stored in a stack, or in a queue, which is a sequential-accessed storage-medium.

In the present invention, motivational materials relating two items may be considered as part of the learning material of one of those items. After the student has successfully learnt a first line-item, there may not be any relationship-item for that line-item. Under that situation, the system 100 selects a second un-learnt line-item for the student to learn. In some situations, the system may not immediately generate the core learning materials on the second line-item. Instead, the system may generate some introductory, motivational materials on the relationship-item relating the first line-item and the second line-item. After the motivational materials are generated, then the system 100 generates the learning materials for the second line-item. Only after the student has successfully learnt the second line-item, then the system 100 generates the core learning materials on the relationship-item relating the first and the second line-items. The motivational materials are not for fully teaching the student the relationship-item. Those materials are only for motivational purposes; and, in the present invention, they are considered as part of the learning materials for the second line-item. As an example, the first line-item is polynomials, and the second line-item is differentiation. After generating learning materials on polynomials, the system generates motivational materials on polynomial differentiation, such as calculating the trajectory of a ball fired from a cannon. Based on the motivational materials, the student does not understand the basic concept of differentiation. However, the motivational materials encourage the student to learn the second line-item. After generating the motivational materials, the system 100 generates the core learning materials on differentiation, which is the second line-item. Then, the system 100 generates learning materials for the relationship-item of polynomial differentiation. Thus, in this example, the motivational materials are considered as part of the learning materials of the following line-item, which is the second line-item.

The present invention describes an instructor setting a line-item probability P, which, in turn, selects an un-learnt line-item or an un-learnt relationship-item. In another embodiment, the selector 102 automatically selects the probability P, which changes as the student is studying through the subject. The probability P depends on the its previously selected item. To illustrate such an embodiment, suppose P(n) is the line-item probability after choosing n items, then $$P(n+1)=F(P(n)) \; n>0$$

where F is a function of P(n). The initial value P(0) is randomly set by the system to be between 0 and 1. The idea is that the invented system tends to switch to teach a relationship-item after teaching one or more line-items, and vice versa. To increase the probability of choosing a relationship-item after one or more line-items, F produces a value smaller than its argument P(n). Similarly, to increase the probability of choosing a line-item after one or more relationship-items, F produces a value larger than its argument P(n). The following serves as examples for this embodiment, with PI being the previously selected item:

1. $P(n+1)=Max(0,P(n)-c)$ if PI is a line-item.
  $P(n+1)=Min(1,P(n)+d)$ if PI is a relationship-item.

"Min" denotes "The minimum of." Both c and d are constants between 0 and 1; they are chosen to reflect how quickly the invented system selects a different type of item. Each time a relationship-item is selected, P is increased by an amount of d, until P reaches 1. Similarly, each time a line-item is selected, PI is reduced by an amount of d, until P becomes 0.

2. $P(n+1)=r*P(n)$ if PI is a line-item.
  $P(n+1)=P(n)+m*(1-P(n))$ if PI is a relationship-item.

Both r and m are constants between 0 and 1. Again, they are chosen to reflect how quickly the invented system selects a different type of item.

3. $P(n+1)=r*P(n)$ if PI is a line-item and its assessed result is satisfactory.
  $P(n+1)=P(n)$ if PI is a line-item and its assessed result is unsatisfactory.
  $P(n+1)=P(n)+m*(1-P(n))$ if PI is a relationship-item.

This example is similar to the second example, except when PI is a line-item, P is changed only if the student has demonstrated a satisfactory result for PI.

In another embodiment, the system 100 also includes a reporter, which is connected to the selector to report on the student's performance in learning the subject. In one embodiment, the report can be the assessment entries received by the selector 102.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer-aided-educational method for furthering a student's understanding in a subject through relationship learning, with the subject being divided into line-items and relationship-items, with each relationship-item relating two or more items, and with the items being separated into learnt and un-learnt elements, the method comprising the steps of:
   selecting an un-learnt element;
   generating learning materials for the student to learn the selected un-learnt element;
   assessing the student's learning progress in the selected element; and
   if the assessment on the selected element is satisfactory, then classifying one or more relationship-items to be learnt as un-learnt elements, with each classified relationship-item relating the selected element with one or more learnt elements.

2. A computer-aided-educational method as recited in claim 1 wherein if the assessment on the selected element is satisfactory, the method further comprises the step of re-classifying the selected element as a learnt-element.

3. A computer-aided-educational method as recited in claim 2 further comprising the step of repeating from the step of selecting an un-learnt element after the step of (if the assessment on the selected element is satisfactory).

4. A computer-aided-educational method as recited in claim 3 wherein if the assessment on the selected element is satisfactory and at least one relationship-item has been classified, then in the subsequent step of selecting an un-learnt element, one of those classified relationship-items is selected.

5. A computer-aided-educational method as recited in claim 4 wherein:
   each classified relationship-item has a difficulty level; and
   the selection of each classified relationship-item depends on its difficulty level.

6. A computer-aided-educational method as recited in claim 4 wherein:
   each classified relationship-item has an elapsed time indicating the amount of time between the time when the relationship-item was classified as an un-learnt element and the current time of selecting an un-learnt element; and
   the selection of each classified relationship-item depends on its elapsed time.

7. A computer-aided-educational method as recited in claim 4 wherein:
   each classified relationship-item has a failed factor indicating the number of times the student has failed learning that relationship-item; and
   the selection of each classified relationship-item depends on its failed factor.

8. A computer-aided-educational method as recited in claim 3 wherein the step of selecting an un-learnt element comprises selecting an un-learnt line-item.

9. A computer-aided-educational method as recited in claim 8 wherein:
   each line-item has a difficulty level; and
   the selection of each un-learnt line-item depends on its difficulty level.

10. A computer-aided-educational method as recited in claim 8 wherein:
    each line-item has a failed factor indicating the number of times the student has failed learning that line-item; and
    the selection of each un-learnt line-item depends on its failed factor.

11. A computer-aided-educational method as recited in claim 3 wherein:
    the method further includes the step of inputting a line-item probability; and
    the step of selecting an un-learnt element comprising the steps of:
    generating a random number;
    comparing the random number with the line-item probability;
    if the random number is less than the line-item probability, selecting an un-learnt line-item as the un-learnt element; and
    if the random number is not less than the line-item probability, selecting an un-learnt relationship-item as the un-learnt element.

12. A computer-aided-educational method as recited in claim 11 wherein:
  for the step of selecting an un-learnt line-item,
    if there is no more un-learnt line-item, then an un-learnt relationship-item is selected; and
  for the step of selecting an un-learnt relationship-item,
    if there is no more un-learnt relationship-item, then an un-learnt line-item is selected.

13. A computer-aided-educational method as recited in claim 3 further comprising
  the step of generating a line-item probability; and
  wherein the step of selecting an un-learnt element comprises the steps of:
    generating a random number;
    comparing the random number with the line-item probability;
    if the random number is less than the line-item probability, selecting an un-learnt line-item as the un-learnt element; and
    if the random number is not less than the line-item probability, selecting an un-learnt relationship-item as the un-learnt element.

14. A computer-aided-educational method as recited in claim 3 wherein the step of selecting an un-learnt element comprises selecting an un-learnt relationship-item before selecting any un-learnt line-items.

15. A computer-aided-educational method as recited in claim 1 wherein the learning materials include study plans.

16. A computer-aided-educational method as recited in claim 1 wherein the learning materials include questions.

17. A computer-aided-educational method as recited in claim 1 further comprising:
  the step of re-classifying the selected element as a learnt-element if the assessment on the selected element is satisfactory; and
  the step of repeating from the step of selecting an un-learnt element after the step of (if the assessment on the selected element is satisfactory); and wherein:
  if the assessment on the selected element is satisfactory and at least one relationship-item has been classified, then in the subsequent step of selecting one un-learnt element, one of those classified relationship-items is selected;
  each classified relationship-item has a difficulty level;
  the selection of each classified relationship-item depends on its difficulty level; and
  the learning materials include study plans and questions.

18. A computer-aided-educational system for furthering a student's understanding in a subject through relationship learning, with the subject being divided into line-items and relationship-items, with each relationship-item relating two or more items, and with the items separated into learnt and un-learnt elements, the system comprising:
  a selector for selecting an un-learnt element;
  a generator for generating learning materials for the student to learn the selected element;
  a presenter for presenting the learning materials to the student; and
  an assessor for assessing the student's learning progress in the selected element, such that if the assessment on the selected element is satisfactory, then the selector classifies one or more relationship-items to be learnt as un-learnt elements, with each classified relationship-item relating the selected element with one or more learnt elements.

19. A computer-aided-educational system as recited in claim 18 wherein if the assessment on the selected element is satisfactory, then the selector also re-classifies the selected element as a learnt-element.

20. A computer-aided-educational system as recited in claim 19 wherein the selector selects another un-learnt element after the assessor assesses the student's learning progress in the prior selected element.

* * * * *